United States Patent Office 3,395,011
Patented July 30, 1968

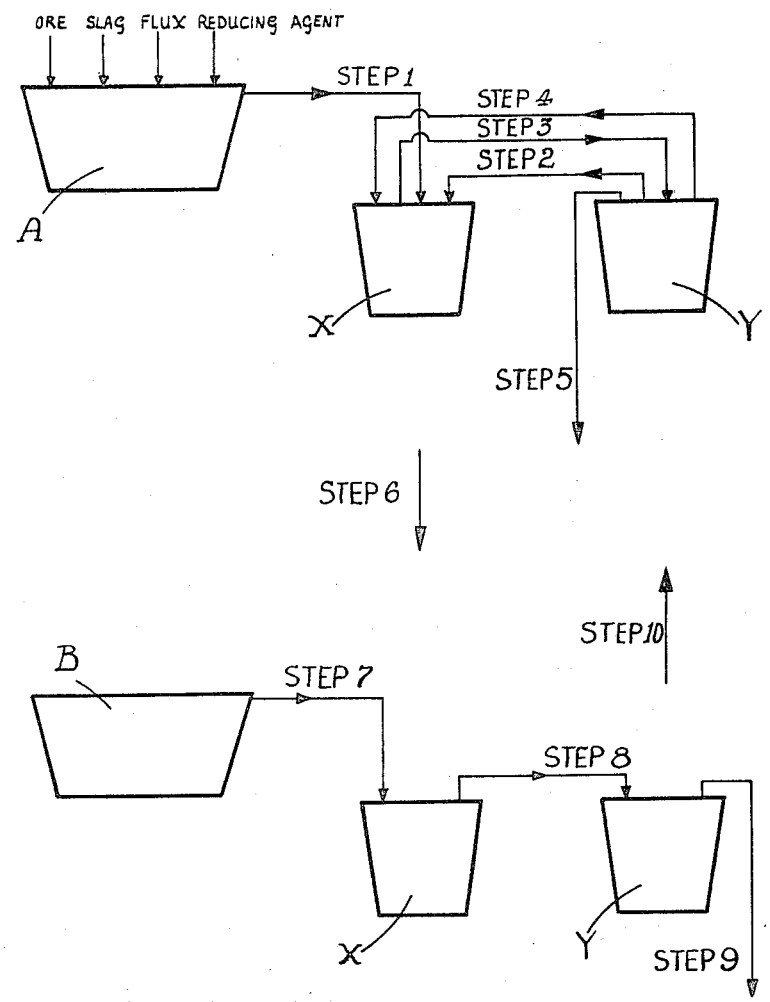

3,395,011
PRODUCTION OF LOW SILICON, MEDIUM TO
LOW, CARBON FERRO-MANGANESE
Janos F. Dery, Jacob J. Coetzee, and Sigurd S. Selmer-Olsen, Linden, Johannesburg, Transvaal, Republic of South Africa, assignors to African Metals Corporation Limited, Johannesburg, Transvaal, Republic of South Africa
Filed Apr. 21, 1966, Ser. No. 544,154
Claims priority, application Republic of South Africa, May 4, 1965, 2,331/65
7 Claims. (Cl. 75—133.5)

This invention relates to the production of low silicon, medium to low carbon ferro-manganese.

One known process for the production of low silicon, medium to low carbon ferro-manganese comprises fusing manganese ore together with lime and silico-ferro-manganese in an electric furnace, sufficient ore and lime being used to react with the silicon in the silico-ferro-manganese to give an intermediate ferro-manganese alloy containing 7–10% silicon. The slag is then substantially all removed and a fresh batch of ore and lime added to the furnace, fused and reacted with the intermediate ferro-manganese alloy. Final removal of the silicon content of the alloy to below 1.5% is thus achieved.

The draw-backs of this process are that substantially all the reactions take place in an electric furnace, thus reducing output per day and increasing refractory lining costs. Further, the slags arising out of the operation are high in manganese content and must be used in other processes such as the production of silico-ferro-manganese in order to extract the maximum of the manganese values contained therein.

Another known process consists in preparing a melt of manganese ore, lime and sufficient carbonaceous material to effect partial reduction of the manganese values, to produce a melt containing 36 to 52% manganese, reacting this melt in a two-step process with a silico-ferro-manganese containing 16 to 36% silicon to produce low silicon, low to medium carbon ferro-manganese and a slag containing 18 to 24% manganese. This slag is too high in manganese to be discarded and is therefore reacted with manganese ore, quartz and carbon to produce silicon-ferro-manganese containing 16–36% silicon.

The disadvantages of the above process are that it requires a high grade, low iron and low silica, managnese ore in order to achieve the analyses specified for the melt. Further, the final slag resulting from the operation requires further processing in order to extract more of the manganese before it can be discarded without great loss.

It is an object of the present invention to provide a process in which the above-mentioned disadvantages are eliminated or at least minimised.

According to the present invention a cyclic process for the production of low silicon, medium to low carbon ferro-manganese includes the steps of reacting a molten synthetic reaction slag containing 23 to 35% manganese, substantially all of which is in the manganeous form, and 5 to 20% $SiO_2$, with an intermediate ferro-manganese alloy containing 5 to 20% silicon to produce a final low silicon, medium to low carbon ferro-manganese and a partially-spent slag containing 13 to 22% manganese; and reacting partially-spent slag with fresh silico-ferro-manganese containing 15 to 35% silicon to produce intermediate ferro-manganese alloy containing 5 to 20% silicon and a final slag containing less than 10% manganese.

The final slag may be discarded.

For the purposes of this specification the term "low silicon, medium to low carbon ferro-manganese" is intended to denote ferro-manganese containing 1.5% by weight or less silicon and 3.0% by weight or less carbon.

All or part of the intermediate ferro-manganese alloy produced by the reaction between partially spent slag and fresh silico-ferro-manganese is reacted with synthetic reaction slag to achieve cyclic operation.

As will become clear from the succeeding description, the terms "partially-spent" slag and "final" slag, as well as the terms "fresh" silico-ferro-manganese, "intermediate" ferro-manganese alloy and "final" low silicon, medium to low carbon ferro-manganese, are used to indicate relative conditions of various materials involved in the cyclic process. Also, as it will become clear from the succeeding description, the terms "synthetic" reaction slag and "fresh" silico-ferro-manganese are used to signify materials which are not derived from the cyclic process itself but from extraneous sources.

It is preferable for the synthetic reaction slag to contain 26 to 30% manganese and 8 to 13% $SiO_2$. Furthermore, the intermediate ferro-manganese alloy preferably contains 7 to 15% silicon.

The synthetic reaction slag may be prepared extraneously to the cyclic process by melting manganese ore and/or a manganese slag which may originate from a high carbon ferro-manganese production operation, a basic fluxing agent, and a reducing agent, these ingredients being present in amounts to yield a synthetic reaction slag having the required composition.

The synthetic reaction slag may be conveniently prepared in any suitable furnace, preferably in a submerged arc electric furnace. Since ores containing high ratios of manganese to iron by weight and limited amounts of silica are costly, it is preferred from the economical point of view to derive at least part of the manganese content of the synthetic reaction slag from slags such as are obtained during the production of high carbon ferro-manganese. Taking in slags from other operations has the further advantage that these slags contain all the manganese in the manganeous form. These slags may be added to the furnace in which the synthetic reaction slag is prepared is either solid or liquid form, advantageously as a liquid. The proportion of the said manganese slag that can be added to the burden for the synthetic reaction slag producing furnace is determined by the silica content of the slag so added. The silica content of the resulting synthetic reaction-slag should not exceed 20%, preferably not 13%.

The basic flux added to the synthetic reaction-slag producing furnace may be any well-known basic material such as limestone, magnesite or dolamite, which may be in the calcined condition.

The reducing agent in the synthetic reaction-slag producing furnace burden serves to reduce any manganese oxides present in the ore of a higher order than the divalent form, to the manganous form. The quantity added is preferably insufficient to reduce the oxides in the burden to their metals unless it is desired preferentially to reduce some of the contained iron oxides to iron and thus enrich the synthetic reaction slag in manganese. The reducing agent may be coal, coke, ferro-manganese, silico-ferro-manganese, ferro-silicon or the like.

The reactions between the slag and metal phases, namely between synthetic reaction slag and intermediate ferro-manganese alloy in the one case and partially-spent slag and fresh silico-ferro-manganese in the other case, are preferably carried out in vessels external to the furnaces wherein the principal reactants, namely snythetic reaction slag and fresh silico-ferro-manganese, are prepared. The fresh silico-ferro-manganese is preferably in a molten state reacted with the partially-spent slag.

The heat developed during the reactions between the slag and metal constituents, namely synthetic reaction slag and intermediate alloy on the one hand and partially-spent slag and fresh silico-ferro-manganese on the other hand, is limited and becomes progressively more inadequate to the requirements of the process with increasing silica content of the synthetic reaction slag. It is therefore advantageous to bring the synthetic reaction slag and the intermediate alloy together in liquid form. It is further preferred to heat both the synthetic reaction slag and the silico-ferro maganese to between 1500° and 1700° C. before the reactions.

Should the silica content of the synthetic reaction slag approach the lower limit of 5%, it may be beneficial to add some of the intermediate ferro-manganese alloy in the solid, crushed state during the reaction between synthetic reaction slag and intermediate alloy, in order to control the heat developed during the reaction.

The reactions between the synthetic reaction slag and the intermediate ferro-manganese alloy in the one case and the partially-spent slag and fresh silico-ferromanganese in the other case are advantageously carried out in reaction vessels such as refractory-lined ladles, shaking ladles or similar equipment specifically designed to facilitate interphase reactions. The linings of the reaction vessels are preferably constructed of basic material such as magnesite or dolomite bricks or ramming mixtures.

The reactions between the metal and slag phases, namely between the intermediate ferro-manganese alloy and the synthetic reaction slag on the one hand and between the fresh silico-ferro-manganese and partially-spent slag on the other hand, may be carried out by pouring over from one ladle containing both phases into another ladle and subsequently returning them to the first ladle if necessary, such pouring being carried out in such a manner as to obtain maximum contact between the two phases. Should it be necessary for the completion of the reactions, the process of re-pouring the slag and metal may be repeated. As mentioned above, a shaking ladle may also be employed with advantage, the epicyclic motion of the shaking ladle ensuring reaction to take place in a short interval of time.

The slag to metal ratio in the slag-metal reactions, namely synthetic reaction slag and intermediate ferro-manganese alloy in the one case and partially-spent slag and fresh silico-ferro-manganese in the other case, may be from 1.5:1 to 3.0:1, preferably from 2.0:1 to 2.5:1.

The composition of the low silicon, medium to low carbon ferro-manganese may be adjusted by methods known to those skilled in the art. For instance, the manganese content of the final low silicon, medium to low carbon ferro-manganese may be adjusted up to 90% by varying the Mn to Fe ratio of the synthetic reaction slag and/or by varying the ratio of synthetic reaction slag to fresh silnco-ferro-manganese in the process. It can also be varied by using fresh silico-ferro-manganese of different manganese contents. Similarly the silicon content of the final ferro-manganese can be adjusted between 0.1 to 1.5% by varying the ratio by weight of the synthetic slag to the fresh silico-ferro-manganese. The carbon content of the product is controlled principally by the silicon content of the fresh silico-ferro-manganese, carbon contents varying for instance from 0.05% to 3.0% being readily achieved.

It is not essential that all the intermediate ferro-manganese alloy produced by the reaction between partially-spent slag and fresh silico-ferro-manganese be reacted directly with synthetic reaction slag. Part of the intermediate ferro-manganese alloy may also be withdrawn from the process at this stage. It may then be used in the solid, crushed state to control the heat development during the reaction between synthetic reaction slag and intermediate ferro-manganese alloy, as described previously, or it may be used for other production purposes or may be marketed as such.

A preferred embodiment of the cyclic process according to the invention in which two ladles are used as reaction vessels, will now be described by way of example with reference to the accompanying drawing which represents a flow-diagram of the process.

Furnace A is a unit in which synthetic reaction slag is prepared extraneously to the cyclic process and is heated to the desired temperature.

Furnace B is a fresh silico-ferro-manganese furnace. This may be a smelting furnace in which the alloy is produced extraneously to the cyclic process, but it is preferred to use a holding-furnace in which extraneously produced alloy can be adjusted with regard to analysis and temperature, to meet the requirements of the process and the grade of the low silicon, medium to low carbon ferro-manganese to be made.

Ladles X and Y are the reaction vessels. At least one of the ladles could be with advantage constructed in such a manner that the metal can be first discharged while the slag is retained in the ladle, such as a tea-pot ladle.

Manganese ore, manganese slag, a basic flux such as limestone and a reducing agent such as coke are charged to furnace A. A synthetic reaction slag is obtained from this furnace containing 26 to 30% manganese, substantially all of which is in the magnanous state, and 8 to 13% silica.

A predetermined weight of the synthetic reaction slag is then poured into ladle X (step 1) and molten intermediate ferro-manganese alloy with a silicon content of 7 to 15% is poured from ladle Y into ladle X (step 2). The weight of synthetic reaction slag employed should be between 2.0 and 2.5 times that of the intermediate ferro-manganese alloy to be converted to low silicon, medium to low carbon ferro-manganese.

The contents of ladle X are then poured back into ladle Y (step 3). The slag is first poured over and then the metal.

The contents of ladle Y are allowed to separate into a slag and a metal phase. The still liquid slag, which is now partially-spent slag, is decanted from the metal into ladle X (step 4). The metal, which is now a final low silicon, medium to low carbon ferro-manganese, is poured from ladle Y (step 5) into pans or moulds (not shown) and is allowed to solidify. Thereafter it is ready for breaking up into the required size for sale.

Ladle X, which contains the liquid partially-spent slag, is then moved from furnace A to furnace B (step 6), which contains molten fresh silico-ferro-manganese containing 15 to 35% silicon. Molten fresh silico-ferro-manganese is discharged from furnace b (step 7) through the liquid partially-spent slag into ladle X. The weight of silico ferro-manganese discharged into ladle X should be controlled to give a slag to metal ratio of between 2.0 to 2.5:1.

The contents of ladle X are then poured over into ladle Y (step 8), again transferring the slag first and then the metal. This process may be repeated if required to complete the reaction.

The contents of ladle Y are allowed to separate into a slag and a metal phase. The slag is now a final slag containing less than 10% manganese, and is discarded after being decanted from the metal (step 9). The metal remaining in ladle Y has a silicon content of between 7 to 15% and is intermediate ferro-manganese alloy.

In normal production all the intermediate ferro-manganese alloy will be returned to the process (step 10) for reaction with a fresh batch of synthetic reaction slag as described above, for repetition of the cycle. However, it is possible to withdraw part of the intermediate ferro-manganese alloy from the process at this stage and allow it to solidify. It may then be added in the solid, crushed state to the reaction vessel during the reaction between synthetic reaction slag and liquid intermediate ferro-manganese alloy. This is a preferred practice when necessary to control excessive heat development where a synthetic reaction slag of low silica content is used. Part the intermediate ferro-manganese alloy may also, at this stage, be withdrawn from the process altogether and used for other production purposes or marketed as such.

The following specific examples are given in order more clearly to illustrate the invention:

Example 1

A synthetic reaction slag containing all the manganese in the manganous state was prepared by melting the following mixture in a submerged arc electric furnace:

| | Parts |
|---|---|
| Manganese ore (appr. 39% Mn) | 43 |
| High carbon ferro-manganese waste slag (appr. 25% Mn) | 24 |
| Hard burnt lime | 29 |
| Coke (appr. 80% fixed carbon) | 4 |
| | 100 |

The resulting synthetic reaction slag contained 26.8% manganese and 12.5% silica. This slag was heated to over 1500° C.

The synthetic slag was then reacted with intermediate ferro-manganese alloy containing 10.5% silicon, the reaction taking place in a shaking ladle, the operation being carried out for 3 minutes. Slag to metal ratio was 2.2:1 by weight.

From this operation a ferro-manganese with the following composition was withdrawn:

| | Percent |
|---|---|
| Manganese | 82.3 |
| Carbon | 0.59 |
| Silicon | 0.34 |

Remainder substantially all iron.

The partially-spent slag obtained from the above operation and containing 15.6% Mn, was retained and reacted with fresh silico-ferro-manganese containing 64.8% Mn, 0.70% C and 20.5% Si, the reaction again taking place in a shaking ladle for a period of 5 minutes. The slag to metal ratio was 2.1:1 by weight.

The final slag obtained from this operation, containing 9.7% Mn, was decanted and discarded. The intermediate ferro-manganese alloy containing 10.1% Si was retained and returned to the process to repeat the cyclic operation.

Example II

A synthetic reaction slag was prepared in the same manner as for Example I from the following mixture:

| | Parts |
|---|---|
| Manganese ore (appr. 39% Mn) | 48.5 |
| High carbon ferro-manganese waste slag (appr. 25% Mn) | 19.5 |
| Hard burnt lime | 27.0 |
| Coke (appr. 80% fixed carbon) | 5.0 |

The resultant synthetic reaction slag contained 27.5% Mn and 12.7% silica and was heated to a temperature of over 1500° C.

This slag was tapped into a ladle and into this was poured molten intermediate ferro-manganese alloy containing 9.9% Si. The slag to metal ratio was 2.5:1 by weight. The contents of this ladle were then transferred to a second ladle by decanting the slag first and then pouring the metal over slowly, from a height of approximately 8 ft. From this operation an alloy of the following composition was withdrawn:

| | Percent |
|---|---|
| Manganese | 81.6 |
| Carbon | 0.51 |
| Silicon | 0.28 |

Remainder substantially all iron.

The partially-spent slag obtained from the above operation and containing 13.7% Mn, was retained in the ladle. Fresh silico-ferro-manganese analysing 64.8% Mn, 0.86% C and 20.0 Si was then tapped into the partially-spent slag, the slag to metal ratio being 2.2 to 1. The contents of this ladle were transferred to a second ladle and back to the first ladle, in the manner described for the previous stage of the operation.

From this reaction resulted a final slag containing 8.1% Mn which was discarded, and an intermediate ferro-manganese alloy containing 9.5% Si.

We claim:

1. A cyclic process for the production of low silicon, medium to low carbon ferro-manganese including the steps of reacting a molten synthetic reaction slag containing 23 to 35% manganese, substantially all of which is in the manganous form, and 5 to 20% $SiO_2$, with an intermediate ferro-manganese alloy containing 5 to 20% silicon thereby to produce a final low silicon, medium to low carbon ferro-manganese and a partially-spent slag containing 13 to 22% manganese; and reacting partially-spent slag with fresh silico-ferro-manganese containing 15 to 35% silicon thereby to produce intermediate ferro-manganese alloy containing 5 to 20% silicon and a final slag containing less than 10% manganese.

2. A process as claimed in claim 1, wherein the synthetic reaction slag contains 26 to 30% manganese and 8 to 13% $SiO_2$.

3. A process as claimed in claim 1, wherein the synthetic reaction slag is prepared by melting together a mixture of a material selected from the group consisting of manganese ore, a manganese slag and mixtures thereof, a basic fluxing agent and a reducing agent.

4. A process as claimed in claim 1, wherein the intermediate ferro-manganese alloy contains 7 to 15% silicon.

5. A process as claimed in claim 1, wherein the slag to metal ratio in the reaction between synthetic reaction slag and intermediate ferro-manganese alloy, as well as in the reaction between partially-spent slag-fresh silico-ferro-manganese, is from 1.5:1 to 3.4:1.

6. A process as claimed in claim 1, wherein the synthetic reaction slag and the silico-ferro-manganese are at temperatures between 1500° C. and 1700° C. at the commencement of their reactions.

7. A process as claimed in claim 5, wherein the slag to metal ratio is from 2.0:1 to 2.5:1.

No references cited.

BENJAMIN HENKIN, *Primary Examiner.*